United States Patent [19]
Yoshioka et al.

[11] Patent Number: 4,993,816
[45] Date of Patent: Feb. 19, 1991

[54] PROJECTION LENS SYSTEM FOR USE IN PROJECTION TELEVISION

[75] Inventors: Yakayuki Yoshioka; Kazuya Akiyama, both of Tokyo, Japan

[73] Assignee: Pioneer Electronic Corporation, Tokyo, Japan

[21] Appl. No.: 513,975

[22] Filed: Apr. 24, 1990

[30] Foreign Application Priority Data

Aug. 3, 1989 [JP] Japan ................... 1-200273

[51] Int. Cl.$^5$ ............................................. G02B 13/18
[52] U.S. Cl. ..................................... 350/432; 350/412
[58] Field of Search ............................. 350/432–435, 350/412

[56] References Cited

U.S. PATENT DOCUMENTS

4,767,199  1/1988  Yamamoto et al. ............ 350/432 X
4,776,682 10/1988  Hosoya ........................... 350/412 X
4,792,218 12/1988  Nakajima et al. .................. 350/432

Primary Examiner—Scott J. Sugarman
Attorney, Agent, or Firm—Finnegan, Henderson, Farabow, Garrett, and Dunner

[57] ABSTRACT

A six-element projection lens system for use in a projection television is disclosed which comprises, in order from the screen side, a positive first lens, a positive meniscus second lens, a negative third lens having a stronger concave surface directed toward the CRT side than on the other side, a biconvex positive fourth lens, a positive meniscus fifth lens, and a negative sixth lens having a concave surface directed toward the screen side, with each of the second and sixth lenses being a plastic lens having at least one aspheric surface.

4 Claims, 5 Drawing Sheets

LATERAL ABERRATION

PROJECTION LENS SYSTEM FOR USE IN PROJECTION TELEVISION

BACKGROUND OF THE INVENTION

The present invention relates to a projection lens system for use in a projection television.

In a projection television, the pictures produced by projection cathode-ray tubes (CRTs) for three colors, red, green and blue, are projected by means of three associated lens systems to form an enlarged color television picture on a screen. In order to design a thinner or smaller projection television, it is necessary to use projection lenses that feature a wide view angle and a large aperture ratio and that provide good imaging performance.

Many versions of projection lenses have heretofore been proposed to meet these requirements and they include a system that solely uses glass lenses in order to insure good quality by achieving high precision of machining; a system that solely uses plastic lenses in order to reduce the production cost while achieving a greater aperture ratio; and a hybrid system that uses glass lenses in combination with aspheric plastic lenses.

The first mentioned projection lens system that is solely composed of glass lenses have the disadvantage that its size and the production cost will increase if one attempts to improve the imaging performance without compromising its large aperture ratio. Further, it suffers the problem of substantial deterioration in marginal performance. The second system which is solely composed of aspheric plastic lenses is suitable for the purpose of providing a large aperture ratio but the precision of machining that can be attained with plastic lenses is not as high as in the case of glass lenses, so it is difficult to fabricate a system that is capable of operating to closely meet the designed performance. Further, plastic lens are sensitive to temperature variations and any changes in their refractive index or shape will result in a change in the position of focal point, leading to deterioration in their imaging performance.

It is generally held that the individual lenses used in a projection television to separately project the pictures produced in red, green and blue CRTs need not be subjected to acromatism. In spectral measurements of the projection CRTs in actual use, however, a broad emission spectrum is observed for blue light whereas spurious emission spectra are observed for green and red light. Therefore, non-achromatic projection lenses are poor in imaging performance for respective colors and are incapable of insuring satisfactory color reproduction.

SUMMARY OF THE INVENTION

The principal object, therefore, of the present invention is to solve the aforementioned problems of the prior art and to provide a projection lens system for use in a projection television that has a large aperture ratio and which yet features a wide view angle to thereby insure good imaging performance.

The lens system of the present invention for use in a projection television is a six-element system which comprises, in order from the screen side, a positive first lens, a positive menitive meniscus second lens, a negative third lens having a stronger concave surface directed toward the CRT side than on the other side, a biconvex positive fourth lens, a positive meniscus fifth lens and a negative sixth lens having a concave surface directed toward the screen side, with each of the second and sixth lenses being a plastic lens having at least one aspheric surface, which lens system satisfies the following conditions (a)–(e):

(a) $0.5 < \psi_{1,2} < 1.1$
(b) $1.1 < \psi_{4,5} < 1.4$
(c) $0.55 < |\psi_3| < 0.9$, $\gamma_3 < 40$
(d) $0.9 < |\psi_6| < 1.3$
(e) $0 < \psi_2 < 0.4$ where $\psi_{1,2}$ is the composite power of the first and second lenses;

$\psi_{4,5}$ is the composite power of the fourth and fifth lenses;

$\psi_3$ is the power of the third lens;

$\psi_6$ is the power of the sixth lens;

$\psi_2$ is the power of the second lens (provided that the power of the overall system is assumed to be unity); and $\gamma_3$ is the Abbe number of the third lens.

DETAILED DESCRIPTION OF THE INVENTION

The use of aspheric plastic lenses helps insure satisfactory compensation for aberrations. Since the lenses in the lens system that have a large refractive power are formed as glass lenses, the deterioration in optical performance that may occur on account of temperature changes is reduced to a negligible level. Further, each of the plastic lenses is thin-walled and is designed to have a meniscus shape in consideration of ease of molding.

Condition (a) relates to the composite power of the first and second lenses. If the upper limit of this condition is exceeded, it becomes difficult to compensate for sagittal flare and a wide-angle system cannot be realized. If the lower limit of condition (a) is not reached, the overall length of the lens system increases and so does the production cost since this results in a bulky projection television. If the lower limit of condition (a) is not reached and if one still keeps the overall length of the lens system unchanged, the powers of the fourth and fifth lenses will increase to upset the balance between axial and extra-axial aberrations.

Condition (b) relates to the composite power of the fourth and fifth lenses. If the upper limit of this condition is exceeded, it becomes difficult to compensate for spherical aberration and a desired large aperture ratio cannot be realized. If the lower limit of condition (b) is not reached, it becomes difficult to compensate for coma and a wide-angle system cannot be realized. Condition (c) sets forth the requirement that should e satisfied in order to attain balance between compensation for chromatic aberration and compensation for other aberrations. If the upper limit of this condition is exceeded with respect to $\gamma_3$, the power of the third lens, it becomes difficult to compensate for spherical aberration and a desired large aperture ratio cannot be realized. If the lower limit of condition (c) is not reached, chromatic aberration is compensated only insufficiently. If condition (c) is not satisfied with respect to $\nu_3$, the Abbe number of the third lens, balance with other lenses cannot be achieved, particularly in the case where an ordinary glass lens having an Abbe number of about 60 is used as each of the positive first, fourth and fifth lenses, and this makes it impossible to effect satisfactory compensation for chromatic aberration.

Condition (d) sets forth the requirement that should be satisfied in order to provide flat image planes. If the upper limit of this condition is exceeded, overcompensation for the field of curvature will occur. If the lower limit of condition (d) is not reached, the field of curvature will be undercompensated.

Condition (e) relates to the sagittal and meridional comas. If the upper limit is exceeded, it is difficult to compensate for the sagittal coma. On the other side if the lower limit is exceeded, it is difficult to compensate for the meridional coma. In both cases, the deterioration in performance due to the temperature change is remarkable.

EXAMPLES

Figure 1:
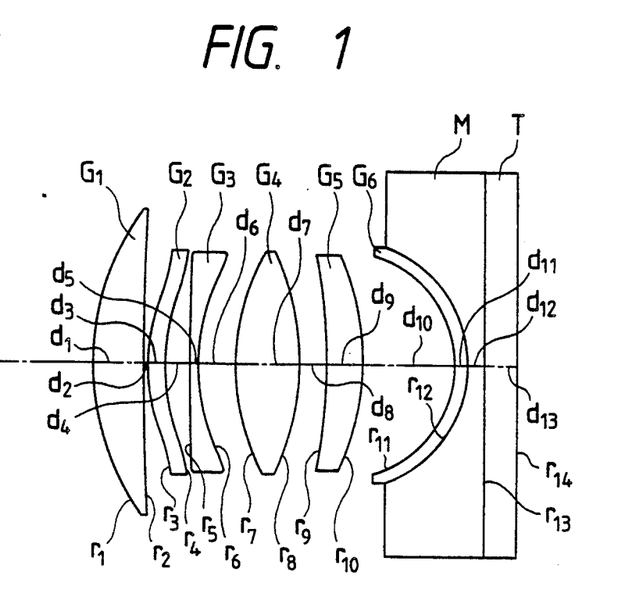
FIG. 1 is a diagrammatic cross-sectional view of the lens system constructed in Example 1.
Figure 2A:
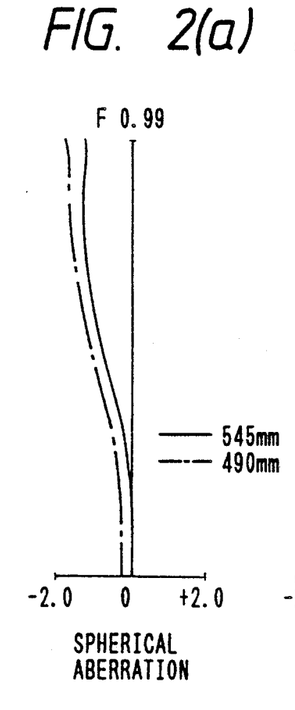
FIG. 2 is a graph plotting the aberration curves obtained with the lens system of Example 1.
Figures 2B, 2C:
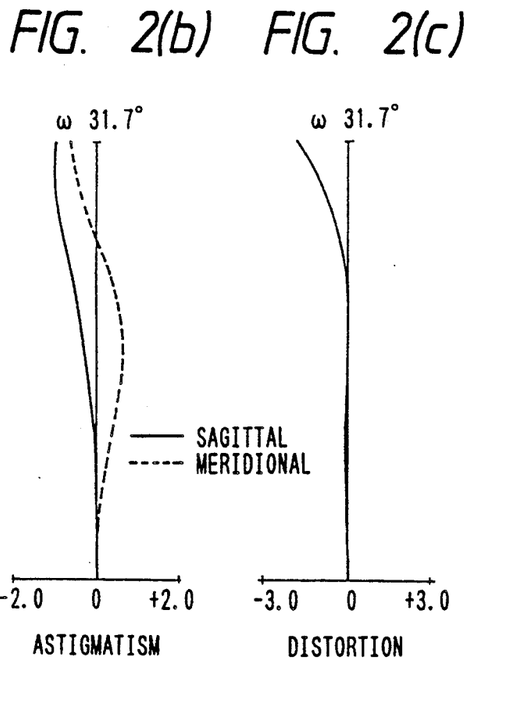
Figure 2D:
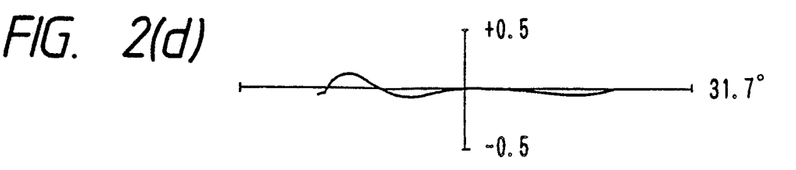
Figure 2E:
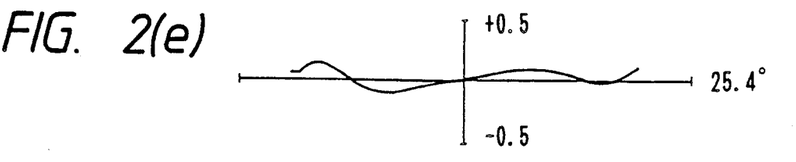
Figure 2F:
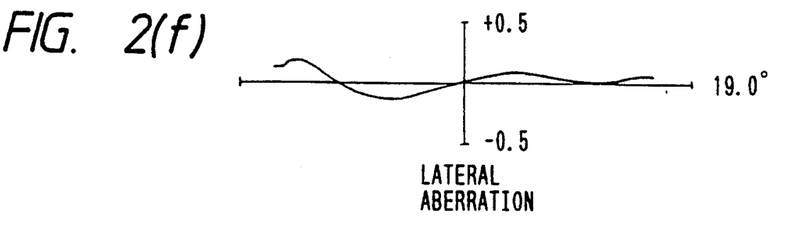
Figure 3:
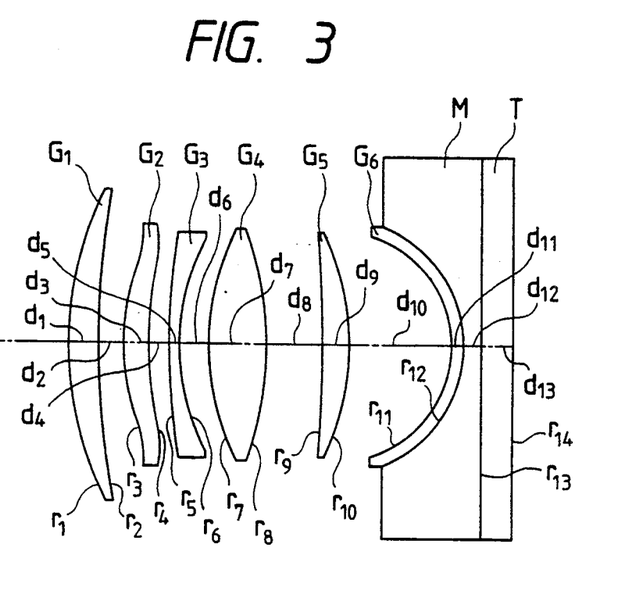
FIG. 3 is a diagrammatic cross-sectional view of the lens system constructed in Example 2.
Figure 4A:
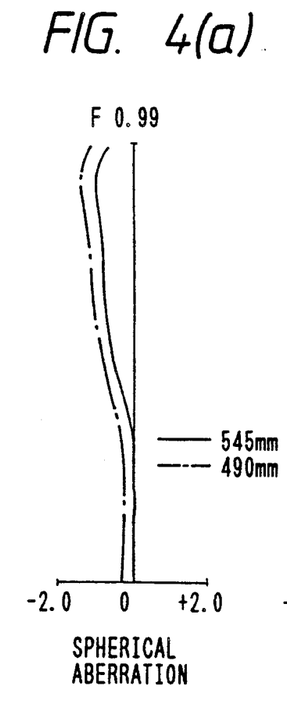
FIG. 4 is a graph plotting the aberration curves obtained with the lens system of Example 2.
Figures 4B, 4C:
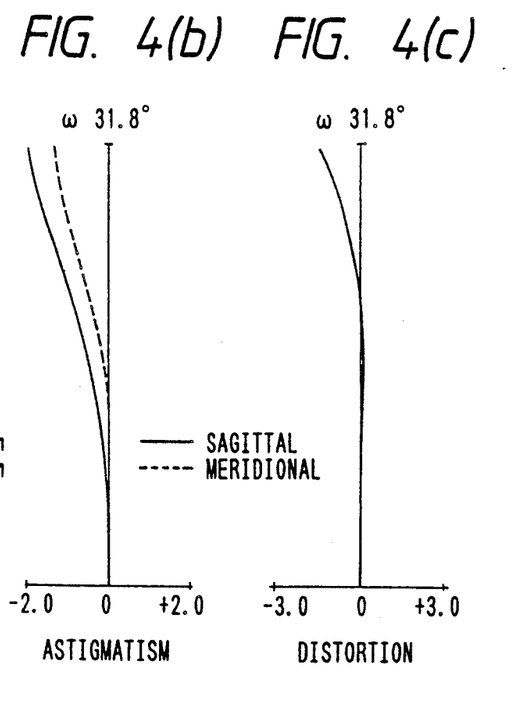
Figure 4D:
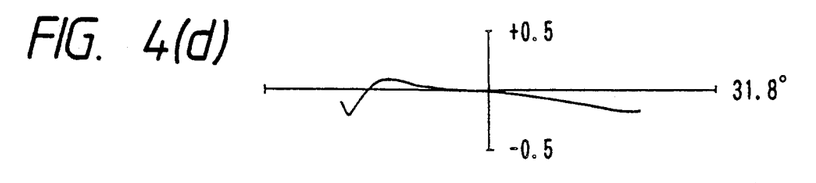
Figure 4E:
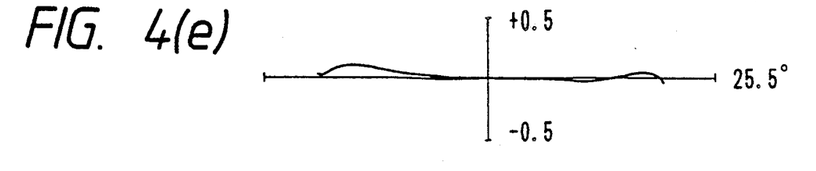
Figure 4F:
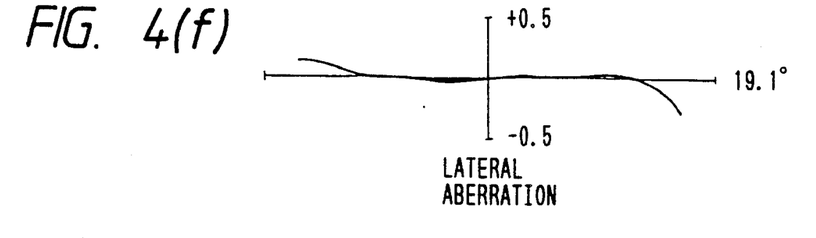
Figure 5:
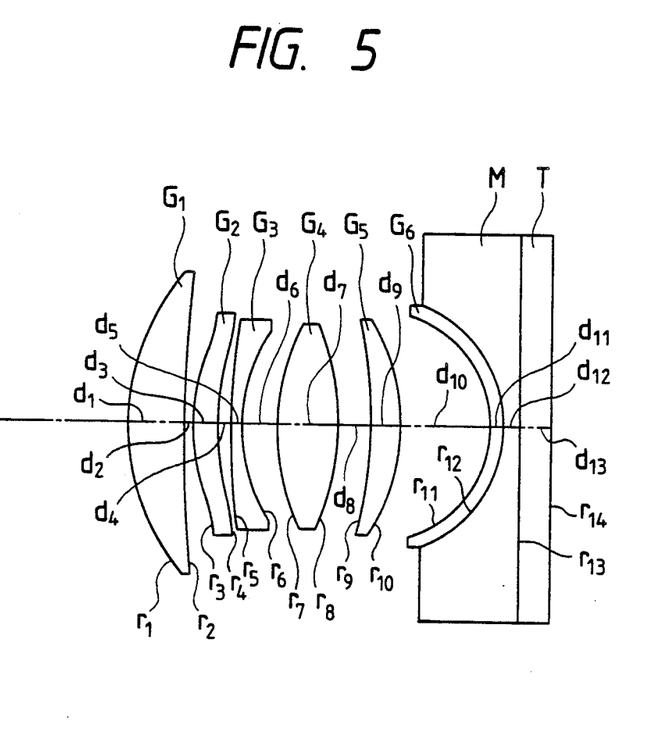
FIG. 5 is a diagrammatic cross-sectional view of the lens system constructed in Example 3.
Figure 6A:
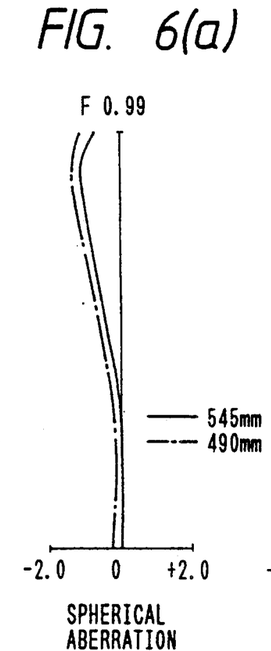
FIG. 6 is a graph plotting the aberration curves obtained with the lens system of Example 3.
Figure 6B:
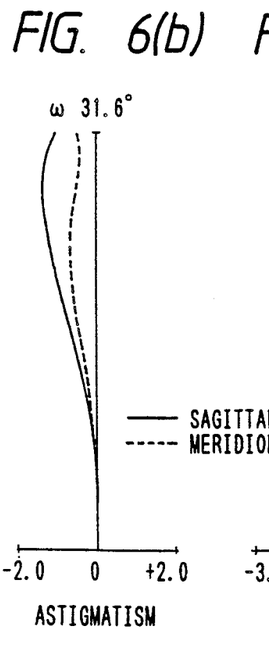
Figure 6C:
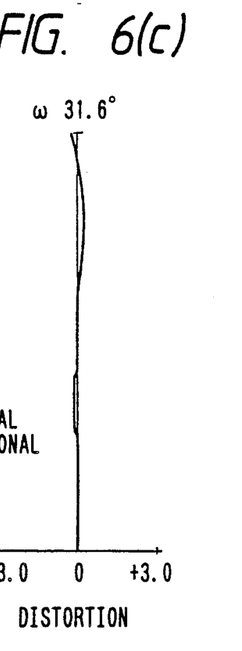
Figure 6D:
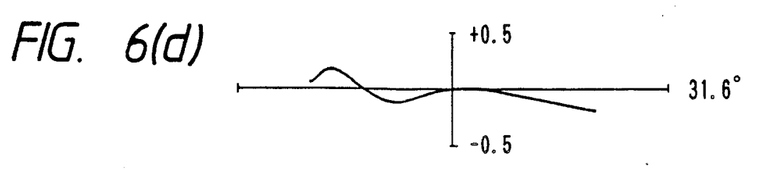
Figure 6E:
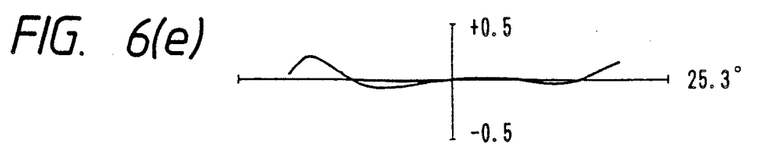
Figure 6F:
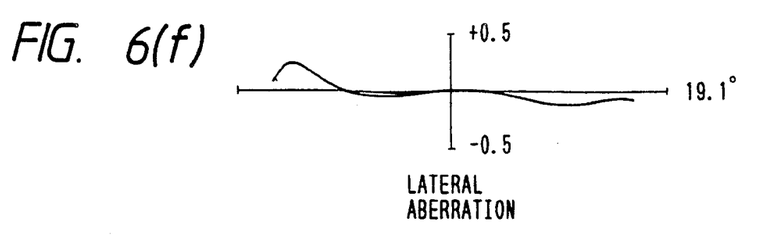

FIGS. 1, 3 and 5 are diagrammatic cross-sectional views of the projection lens systems constructed in Examples 1, 2 and 3, respectively. In each of these examples, a first lens $G_1$, a third lens $G_3$, a fourth lens $G_4$ and a fifth lens $G_55$ are each a glass lens, whereas a second lens $G_2$ and a sixth lens $G_6$ are each a plastic lens. The thirteenth surface of each lens system is provided by the surface of glass faceplate T of a projection CRT and the fourteenth surface is provided by its phosphor screen. A gelled or liquid filler M is placed between the faceplate T and the sixth lens $G_6$ in order to prevent the decrease in contrast or increase in the temperature of the surface of CRT that may occur on account of surface reflection of light.

In the following description, $r_1, r_2, \ldots, r_{14}$ denote the paraxial curvature radii of the surfaces of the six lenses and the glass faceplate of CRT; $d_1, d_2, \ldots, d_{13}$ denote the aerial distances between adjacent surfaces; $N_{d1}, N_{d2}, \ldots, N_{d13}$ denote the refractive indices of the respective surfaces at the d-line; and $\nu_{d1}, \nu_{d3}, \ldots, \nu_{d13}$ denote the Abee numbers of the respective surfaces at the d-line.

The shape of each aspheric surface may be defined as in ordinary aspheric lenses by a rectangular coordinate system X-Y-Z where the direction of optical axis is indicated by Z axis; it is an aspheric surface of rotation symmetry expressed by:

$$Z = \frac{H^2/r}{1 + \sqrt{1 - (k+1)(H/r)^2}} +$$

$$A_4 H^4 + A_6 H^6 + A_8 H^8 + A_{10} H^{10}$$

$$H = \sqrt{X^2 + Y^2}$$

where r is the para-axial curvature radius of the apex of aspheric surface, k is a conicity constant, and $A_4$, $A_6$, $A_8$ and $A_{10}$ are sphericity coefficients of higher orders.

Examples 1, 2 and 3 are described below in terms of numerical data, in which the values of curvature radius and aerial distance are expressed in millimeters.

EXAMPLE 1

Focal length = 82.577 mm; magnification = −0.0961; Aperture ratio = 1:0.99

| | | |
|---|---|---|
| $\psi_{1,2} = 0.70,$ | | $\psi_{4,5} = 1.22,$ |
| $\psi_3 = -0.64,$ | | $\psi_6 = -1.19,$ |
| $\psi_2 = 0.19$ | | |
| $r_1 = 92.93$ | | |
| | $d_1 = 16.25$ | $N_{d1} = 1.639 \quad \nu_{d1} = -1.23$ |
| $r_2 = 815.72$ | | |
| | $d_2 = 1.00$ | $N_{d2} = 1.000$ |
| $r_3 = 63.43$ | | |
| | $d_3 = 6.00$ | $N_{d3} = 1.492 \quad \nu_{d3} = 61.3$ |
| $r_4 = 87.86$ | | |
| | $d_4 = 6.54$ | $N_{d4} = 1.000$ |
| $r_5 = 409.75$ | | |
| | $d_5 = 4.00$ | $N_{d5} = 1.728 \quad \nu_{d5} = 28.3$ |
| $r_6 = 76.16$ | | |
| | $d_6 = 13.17$ | $N_{d6} = 1.000$ |
| $r_7 = 89.42$ | | |
| | $d_7 = 20.50$ | $N_{d7} = 1.589 \quad \nu_{d7} = 61.3$ |
| $r_8 = -95.11$ | | |
| | $d_8 = 11.88$ | $N_{d8} = 1.000$ |
| $r_9 = -211.89$ | | |
| | $d_9 = 8.50$ | $N_{d9} = 1.517 \quad \nu_{d9} = 64.2$ |
| $r_{10} = -83.90$ | | |
| | $d_{10} = 31.12$ | $N_{d10} = 1.000$ |
| $r_{11} = -30.66$ | | |
| | $d_{11} = 3.20$ | $N_{d11} = 1.491 \quad \nu_{d11} = 58.2$ |
| $r_{12} = -35.50$ | | |
| | $d_{12} = 5.00$ | $N_{d12} = 1.438 \quad \nu_{d12} = 63.8$ |
| $r_{13} = \infty$ | | |
| | $d_{13} = 10.30$ | $N_{d13} = 1.542 \quad \nu_{d13} = 55.5$ |
| $r_{14} = \infty$ | | |

| | $r_3$: aspheric surface; | $r_4$: aspheric surface |
|---|---|---|
| k: | 0.0000 | 0.000 |
| $A_4$: | $-0.1165 \times 10^{-5}$ | $-0.1885 \times 10^{-6}$ |
| $A_6$: | $0.1537 \times 10^{-8}$ | $0.1777 \times 10^{-8}$ |
| $A_8$: | $-0.2964 \times 10^{-11}$ | $-0.2939 \times 10^{-11}$ |
| $A_{10}$: | $0.9118 \times 10^{-5}$ | $0.9841 \times 10^{-15}$ |
| | $r_{11}$: aspheric surface; | $r_{12}$: aspheric surface |
| k: | −1.0000 | −0.5000 |
| $A_4$: | $0.4343 \times 10^{-6}$ | 0.0000 |
| $A_6$: | $-0.3192 \times 10^{-8}$ | 0.0000 |
| $A_8$: | $0.1860 \times 10^{-11}$ | 0000 |
| $A_{10}$: | $-0.7189 \times 10^{-15}$ | 0.0000 |

EXAMPLE 2

Focal length = 82.429 mm; magnification = −0.0961; Aperture ratio = 1:0.99

| | | |
|---|---|---|
| $\psi_{1,2} = 0.57,$ | | $\psi_{4,5} = 1.25,$ |
| $\psi_3 = -0.58,$ | | $\psi_6 = -1.23,$ |
| $\psi_2 = 0.30$ | | |
| $r_1 = 115.87$ | | |
| | $d_1 = 9.74$ | $N_{d1} = 1.638 \quad \nu_{d1} = 55.5$ |
| $r_2 = 297.30$ | | |
| | $d_2 = 7.33$ | $N_{d2} = 1.000$ |
| $r_3 = 63.75$ | | |
| | $d_3 = 8.02$ | $N_{d3} = 1.492 \quad \nu_{d3} = 61.3$ |
| $r_4 = 114.42$ | | |
| | $d_4 = 6.83$ | $N_{d4} = 1.000$ |
| $r_5 = 246.97$ | | |
| | $d_5 = 3.00$ | $N_{d5} = 1.728 \quad \nu_{d5} = 28.3$ |
| $r_6 = 72.66$ | | |
| | $d_6 = 9.73$ | $N_{d6} = 1.000$ |
| $r_7 = 83.66$ | | |
| | $d_7 = 17.76$ | $N_{d7} = 1.589 \quad \nu_{d7} = 61.3$ |
| $r_8 = -117.84$ | | |
| | $d_8 = 17.07$ | $N_{d8} = 1.000$ |
| $r_9 = -775.71$ | | |
| | $d_9 = 9.41$ | $N_{d9} = 1.517 \quad \nu_{d9} = 64.2$ |
| $r_{10} = -86.44$ | | |

-continued

|  | $d_{10} = 32.84$ | $N_{d10} = 1.000$ | |
|---|---|---|---|
| $r_{11} = -29.94$ | | | |
| | $d_{11} = 3.20$ | $N_{d11} = 1.491$ | $\nu_{d11} = 58.2$ |
| $r_{12} = -35.50$ | | | |
| | $d_{12} = 5.00$ | $N_{d12} = 1.438$ | $\nu_{d12} = 63.8$ |
| $r_{13} = \infty$ | | | |
| | $d_{13} = 10.30$ | $N_{d13} = 1.542$ | $\nu_{d13} = 55.5$ |
| $r_{14} = \infty$ | | | |

| | $r_3$: aspheric surface; | $r_4$: aspheric surface |
|---|---|---|
| k: | 0.0000 | 0.0000 |
| $A_4$: | $-0.9811 \times 10^{-6}$ | $0.1696 \times 10^{-6}$ |
| $A_6$: | $0.6449 \times 10^{-9}$ | $-0.7440 \times 10^{-10}$ |
| $A_8$: | $-0.2587 \times 10^{-11}$ | $-0.1793 \times 10^{-11}$ |
| $A_{10}$: | $0.8615 \times 10^{-15}$ | $0.7065 \times 10^{-15}$ |
| | $r_{11}$: aspheric surface; | $r_{12}$: aspheric surface |
| k: | $-1.0000$ | $-0.5000$ |
| $A_4$: | $-0.1711 \times 10^{-6}$ | 0.0000 |
| $A_6$: | $-0.2031 \times 10^{-8}$ | 0.0000 |
| $A_8$: | $0.1448 \times 10^{-11}$ | 0.0000 |
| $A_{10}$: | $-0.7534 \times 10^{-15}$ | 0.0000 |

EXAMPLE 3

Focal length = 82.433 mm; magnification = −0.0961; Aperture ratio = 1:0.99

| $\psi_{1,2} = 0.80,$ | $\psi_{4,5} = 1.25,$ |
|---|---|
| $\psi_3 = -0.79,$ | $\psi_6 = -1.23,$ |
| $\psi_2 = 0.29$ | |

| | | | |
|---|---|---|---|
| $r_1 = 86.07$ | | | |
| | $d_1 = 17.01$ | $N_{d1} = 1.639$ | $\nu_{d1} = 55.5$ |
| $r_2 = 547.76$ | | | |
| | $d_2 = 2.31$ | $N_{d2} = 1.000$ | |
| $r_3 = 62.26$ | | | |
| | $d_3 = 8.24$ | $N_{d3} = 1.492$ | $\nu_{d3} = 61.3$ |
| $r_4 = 106.70$ | | | |
| | $d_4 = 4.13$ | $N_{d4} = 1.000$ | |
| $r_5 = 302.46$ | | | |
| | $d_5 = 3.00$ | $N_{d5} = 1.728$ | $\nu_{d5} = 28.3$ |
| $r_6 = 60.51$ | | | |
| | $d_6 = 12.64$ | $N_{d6} = 1.000$ | |
| $r_7 = 87.21$ | | | |
| | $d_7 = 19.03$ | $N_{d7} = 1.589$ | $\nu_{d7} = 61.3$ |
| $r_8 = -91.57$ | | | |
| | $d_8 = 11.65$ | $N_{d8} = 1.000$ | |
| $r_9 = -134.10$ | | | |
| | $d_9 = 8.97$ | $N_{d9}\ 1.517$ | $\nu_{d9} = 64.2$ |
| $r_{10} = -67.43$ | | | |
| | $d_{10} = 30.77$ | $N_{d10} = 1.000$ | |
| $r_{11} = -29.94$ | | | |
| | $d_{11} = 3.20$ | $N_{d11} = 1.491$ | $\nu_{d11} = 58.2$ |
| $r_{12} = -35.50$ | | | |
| | $d_{12} = 5.00$ | $N_{d12} = 1.438$ | $\nu_{d12} = 63.8$ |
| $r_{13} = \infty$ | | | |
| | $d_{13} = 10.30$ | $N_{d13} = 1.542$ | $\nu_{d13} = 55.5$ |
| $r_{14} = \infty$ | | | |

| | $r_3$: aspheric surface; | $r_4$: aspheric surface |
|---|---|---|
| k: | 0.0000 | 0.0000 |
| $A_4$: | $-0.1105 \times 10^{-5}$ | $0.2228 \times 10^{-6}$ |
| $A_6$: | $0.6642 \times 10^{-9}$ | $0.2061 \times 10^{-9}$ |
| $A_8$: | $-0.2522 \times 10^{-11}$ | $-0.1937 \times 10^{-11}$ |
| $A_{10}$: | $0.8587 \times 10^{-15}$ | $0.7969 \times 10^{-15}$ |
| | $r_{11}$: aspheric surface; | $r_{12}$: aspheric surface |
| k: | $-1.0000$ | $-0.5000$ |
| $A_4$: | $0.8443 \times 10^{-6}$ | 0.0000 |
| $A_6$: | $-0.2894 \times 10^{-8}$ | 0.0000 |
| $A_8$: | $0.1602 \times 10^{-11}$ | 0.0000 |
| $A_{10}$: | $-0.9741 \times 10^{-15}$ | 0.0000 |

As already mentioned, filler M is provided between the glass faceplate T of CRT and the sixth lens $G_6$ in each of Examples 1, 2 and 3 in order to prevent the decrease in contrast or increase in the temperature of CRT that may occur on account of surface reflection of light. However, the provision of filler M is not critical for the purposes of the present invention and alternatively, the surface of the sixth lens which is the closer to the CRt (ie., the 12th surface) may be rendered generally flat, with the air being used as a filler medium between the sixth lens G6 and the faceplate T of CRT.

FIGS. 2, 4 and 6 are graphs plotting the aberration curves obtained with the projection lens systems of Examples 1, 2 and 3, respectively. As these graphs show, the projection lens system of the present invention for use in a projection television has a large aperture ratio (F number: 0.99) and yet it is capable of effective compensation for chromatic aberration to realize satisfactory imaging performance at wide view angles.

As described on the foregoing pages, the present invention provides a projection lens system for use in a projection television that is capable of effective compensation for chromatic aberration and which features a sufficiently large aperture ratio and wide view angle to insure satisfactory marginal illumination, whereby desirable imaging performance is provided.

As is also clear from the diagrammatic cross-sectional views of the lens systems of Examples 1-3, each of the plastic lenses used in the present invention is of a meniscus shape, so they can be easily produced by molding with high precision. This enables the lens system of the present invention to be produced at a lower cost without compromising the desirable performance described above.

We claim:

1. A six-element projection lens system for use in a projection television which comprises, in order from the screen side, a positive first lens, a positive meniscus second lens, a negative third lens having a stronger concave surface directed toward the CRT side than on the other side, a biconvex positive fourth lens, a positive meniscus fifth lens, and a negative sixth lens having a concave surface directed toward the screen side, with each of the second and sixth lenses being a plastic lens having at least one aspheric surface, which lens system satisfies the following conditions (a)-(e):

(a) $0.5 < \psi_{1,2} < 1.1$
(b) $1.1 < \psi_{4,5} < 1.4$
(c) $0.55 < |\psi_3| < 0.9,\ \nu < 40$
(d) $0.9 < |\psi_6|\ 1.3$
(e) $0 < \psi_2 < 0.4$ where $\psi_{1,2}$ is the composite power of the first and second lenses;

$\psi_{4,5}$ is the composite power of the fourth and fifth lenses;

$\psi_3$ is the power of the third lens;

$\psi_6$ is the power of the sixth lens;

$\psi_2$ is the power of the second lens (provided that the power of the overall system is assumed to be unity); and $\nu_3$ is the Abbe number of the third lens.

2. The system according to claim 1, further satisfying the following chart:

Focal length = 82.577 mm; magnification = −0.0961; Aperture ratio = 1:0.99

| $\psi_{1,2} = 0.70,$ | $\psi_{4,5} = 1.22,$ |
|---|---|
| $\psi_3 = -0.64,$ | $\psi_6 = -1.19,$ |
| $\psi_2 = 0.19$ | |

| | | | |
|---|---|---|---|
| $r_1 = 92.93$ | | | |
| | $d_1 = 16.25$ | $N_{d1} = 1.639$ | $\nu_{d1} = -1.23$ |
| $r_2 = 815.72$ | | | |
| | $d_2 = 1.00$ | $N_{d2} = 1.000$ | |
| $r_3 = 63.43$ | | | |
| | $d_3 = 6.00$ | $N_{d3} = 1.492$ | $\nu_{d3} = 61.3$ |
| $r_4 = 87.86$ | | | |
| | $d_4 = 6.54$ | $N_{d4} = 1.000$ | |

-continued

| | | | |
|---|---|---|---|
| $r_5 = 409.75$ | | | |
| | $d_5 = 4.00$ | $N_{d5} = 1.728$ | $\nu_{d5} = 28.3$ |
| $r_6 = 76.16$ | | | |
| | $d_6 = 13.17$ | $N_{d6} = 1.000$ | |
| $r_7 = 89.42$ | | | |
| | $d_7 = 20.50$ | $N_{d7} = 1.589$ | $\nu_{d7} = 61.3$ |
| $r_8 = -95.11$ | | | |
| | $d_8 = 11.88$ | $N_{d8} = 1.000$ | |
| $r_9 = -211.89$ | | | |
| | $d_9 = 8.50$ | $N_{d9} = 1.517$ | $\nu_{d9} = 64.2$ |
| $r_{10} = -83.90$ | | | |
| | $d_{10} = 31.12$ | $N_{d10} = 1.000$ | |
| $r_{11} = -30.66$ | | | |
| | $d_{11} = 3.20$ | $N_{d11} = 1.491$ | $\nu_{d11} = 58.2$ |
| $r_{12} = -35.50$ | | | |
| | $d_{12} = 5.00$ | $N_{d12} = 1.438$ | $\nu_{d12} = 63.8$ |
| $r_{13} = \infty$ | | | |
| | $d_{13} = 10.30$ | $N_{d13} = 1.542$ | $\nu_{d13} = 55.5$ |
| $r_{14} = \infty$ | | | |

| | $r_3$: aspheric surface; | $r_4$: aspheric surface |
|---|---|---|
| k: | 0.0000 | 0.000 |
| $A_4$: | $-0.1165 \times 10^{-5}$ | $-0.1885 \times 10^{-6}$ |
| $A_6$: | $0.1537 \times 10^{-8}$ | $0.1777 \times 10^{-8}$ |
| $A_8$: | $-0.2964 \times 10^{-11}$ | $-0.2939 \times 10^{-11}$ |
| $A_{10}$: | $0.9118 \times 10^{-15}$ | $0.9841 \times 10^{-15}$ |
| | $r_{11}$: aspheric surface; | $r_{12}$: aspheric surface |
| k: | $-1.0000$ | $-0.5000$ |
| $A_4$: | $0.4343 \times 10^{-6}$ | 0.0000 |
| $A_6$: | $-0.3192 \times 10^{-8}$ | 0.0000 |
| $A_8$: | $0.1860 \times 10^{-11}$ | 0.0000 |
| $A_{10}$: | $-0.7189 \times 10^{-15}$ | 0.0000 |

3. The system according to claim 1, further satisfying the following chart:

Focal length = 82.429 mm; magnification = $-0.0961$; Aperture ratio = 1:0.99

| | | | |
|---|---|---|---|
| $\psi_{1,2} = 0.57$, | | $\psi_{4,5} = 1.25$, | |
| $\psi_3 = -0.58$, | | $\psi_6 = -1.23$, | |
| $\psi_2 = 0.30$ | | | |
| $r_1 = 115.87$ | | | |
| | $d_1 = 9.74$ | $N_{d1} = 1.638$ | $\nu_{d1} = 55.5$ |
| $r_2 = 297.30$ | | | |
| | $d_2 = 7.33$ | $N_{d2} = 1.000$ | |
| $r_3 = 63.75$ | | | |
| | $d_3 = 8.02$ | $N_{d3} = 1.492$ | $\nu_{d3} = 61.3$ |
| $r_4 = 114.42$ | | | |
| | $d_4 = 6.83$ | $N_{d4} = 1.000$ | |
| $r_5 = 246.97$ | | | |
| | $d_5 = 3.00$ | $N_{d5} = 1.728$ | $\nu_{d5} = 28.3$ |
| $r_6 = 72.66$ | | | |
| | $d_6 = 9.73$ | $N_{d6} = 1.000$ | |
| $r_7 = 83.66$ | | | |
| | $d_7 = 17.76$ | $N_{d7} = 1.589$ | $\nu_{d7} = 61.3$ |
| $r_8 = -117.84$ | | | |
| | $d_8 = 17.07$ | $N_{d8} = 1.000$ | |
| $r_9 = -775.71$ | | | |
| | $d_9 = 9.41$ | $N_{d9} = 1.517$ | $\nu_{d9} = 64.2$ |
| $r_{10} = -86.44$ | | | |
| | $d_{10} = 32.84$ | $N_{d10} = 1.000$ | |
| $r_{11} = -29.94$ | | | |
| | $d_{11} = 3.20$ | $N_{d11} = 1.491$ | $\nu_{d11} = 58.2$ |
| $r_{12} = -35.50$ | | | |

-continued

| | | | |
|---|---|---|---|
| | $d_{12} = 5.00$ | $N_{d12} = 1.438$ | $\nu_{d12} = 63.8$ |
| $r_{13} = \infty$ | | | |
| | $d_{13} = 10.30$ | $N_{d13} = 1.542$ | $\nu_{d13} = 55.5$ |
| $r_{14} = \infty$ | | | |

| | $r_3$: aspheric surface; | $r_4$: aspheric surface |
|---|---|---|
| k: | 0.0000 | 0.0000 |
| $A_4$: | $-0.9811 \times 10^{-6}$ | $0.1696 \times 10^{-6}$ |
| $A_6$: | $0.6449 \times 10^{-9}$ | $-0.7440 \times 10^{-10}$ |
| $A_8$: | $-0.2587 \times 10^{-11}$ | $-0.1793 \times 10^{-11}$ |
| $A_{10}$: | $0.8615 \times 10^{-15}$ | $0.7065 \times 10^{-15}$ |
| | $r_{11}$: aspheric surface; | $r_{12}$: aspheric surface |
| k: | $-1.0000$ | $-0.5000$ |
| $A_4$: | $-0.1711 \times 10^{-6}$ | 0.0000 |
| $A_6$: | $-0.2031 \times 10^{-8}$ | 0.0000 |
| $A_8$: | $0.1448 \times 10^{-11}$ | 0.0000 |
| $A_{10}$: | $-0.7534 \times 10^{-15}$ | 0.0000 |

4. The system according to claim 1, further satisfying the following chart;

Focal length = 82.433 mm; magnification = $-0.0961$; Aperture ratio = 1:0.99

| | | | |
|---|---|---|---|
| $\psi_{1,2} = 0.80$ | | $\psi_{4,5} = 1.25$, | |
| $\psi_3 = -0.79$, | | $\psi_6 = -1.23$, | |
| $\psi_2 = 0.29$ | | | |
| $r_1 = 86.07$ | | | |
| | $d_1 = 17.01$ | $N_{d1} = 1.639$ | $\nu_{d1} = 55.5$ |
| $r_2 = 547.76$ | | | |
| | $d_2 = 2.31$ | $N_{d2} = 1.000$ | |
| $r_3 = 62.26$ | | | |
| | $d_3 = 8.24$ | $N_{d3} = 1.492$ | $\nu_{d3} = 61.3$ |
| $r_4 = 106.70$ | | | |
| | $d_4 = 4.13$ | $N_{d4} = 1.000$ | |
| $r_5 = 302.46$ | | | |
| | $d_5 = 3.00$ | $N_{d5} = 1.728$ | $\nu_{d5} = 28.3$ |
| $r_6 = 60.51$ | | | |
| | $d_6 = 12.64$ | $N_{d6} = 1.000$ | |
| $r_7 = 87.21$ | | | |
| | $d_7 = 19.03$ | $N_{d7} = 1.589$ | $\nu_{d7} = 61.3$ |
| $r_8 = -91.57$ | | | |
| | $d_8 = 11.65$ | $N_{d8} = 1.000$ | |
| $r_9 = -134.10$ | | | |
| | $d_9 = 8.97$ | $N_{d9} = 1.517$ | $\nu_{d9} = 64.2$ |
| $r_{10} = -67.43$ | | | |
| | $d_{10} = 30.77$ | $N_{d10} = 1.000$ | |
| $r_{11} = -29.94$ | | | |
| | $d_{11} = 3.20$ | $N_{d11} = 1.491$ | $\nu_{d11} = 58.2$ |
| $r_{12} = -35.50$ | | | |
| | $d_{12} = 5.00$ | $N_{d12} = 1.438$ | $\nu_{d12} = 63.8$ |
| $r_{13} = \infty$ | | | |
| | $d_{13} = 10.30$ | $N_{d13} = 1.542$ | $\nu_{d13} = 55.5$ |
| $r_{14} = \infty$ | | | |

| | $r_3$: aspheric surface; | $r_4$: aspheric surface |
|---|---|---|
| k: | 0.0000 | 0.0000 |
| $A_4$: | $-0.1105 \times 10^{-5}$ | $0.2228 \times 10^{-6}$ |
| $A_6$: | $0.6642 \times 10^{-9}$ | $0.2061 \times 10^{-9}$ |
| $A_8$: | $-0.2522 \times 10^{-11}$ | $-0.1937 \times 10^{-11}$ |
| $A_{10}$: | $0.8587 \times 10^{-15}$ | $0.7969 \times 10^{-15}$ |
| | $r_{11}$: aspheric surface; | $r_{12}$: aspheric surface |
| k: | $-1.0000$ | $-0.5000$ |
| $A_4$: | $0.8443 \times 10^{-6}$ | 0.0000 |
| $A_6$: | $-0.2894 \times 10^{-8}$ | 0.0000 |
| $A_8$: | $0.1602 \times 10^{-11}$ | 0.0000 |
| $A_{10}$: | $-0.9741 \times 10^{-15}$ | 0.0000 |

\* \* \* \* \*

UNITED STATES PATENT AND TRADEMARK OFFICE
CERTIFICATE OF CORRECTION

PATENT NO. : 4,993,816
DATED : February 19, 1991
INVENTOR(S) : TAKAYUKI YOSHIOKA ET AL.

It is certified that error appears in the above-identified patent and that said Letters Patent is hereby corrected as shown below:

Claim 1, Column 6, Line 41, change "v<40" to --$v_3$<40--; and

Claim 1, Column 6, Line 42, change "1.3" to --<1.3--.

Signed and Sealed this

Nineteenth Day of January, 1993

*Attest:*

DOUGLAS B. COMER

*Attesting Officer*  *Acting Commissioner of Patents and Trademarks*